United States Patent
Lemoine et al.

(10) Patent No.: US 7,407,584 B2
(45) Date of Patent: Aug. 5, 2008

(54) REGULATING AIR VELOCITY CONTINUOUSLY INJECTED INTO BIOLOGICAL WATER TREATMENT REACTOR

(75) Inventors: Cyrille Lemoine, Courbevoie (FR); Michele Payraudeau, Paris (FR)

(73) Assignee: OTV SA S.A. (FR)

( * ) Notice: Subject to any disclaimer, the term of this patent is extended or adjusted under 35 U.S.C. 154(b) by 0 days.

(21) Appl. No.: 11/569,924

(22) PCT Filed: May 27, 2005

(86) PCT No.: PCT/FR2005/001320

§ 371 (c)(1),
(2), (4) Date: May 8, 2007

(87) PCT Pub. No.: WO2006/000680

PCT Pub. Date: Jan. 5, 2006

(65) Prior Publication Data

US 2007/0221580 A1     Sep. 27, 2007

(30) Foreign Application Priority Data

Jun. 2, 2004    (FR) .................................. 04 05970

(51) Int. Cl.
*C02F 3/00* (2006.01)

(52) U.S. Cl. ........................ 210/614; 210/620; 210/220; 210/150; 210/739

(58) Field of Classification Search .................. 210/614, 210/620, 220, 150
See application file for complete search history.

(56) References Cited

U.S. PATENT DOCUMENTS

| | | | | |
|---|---|---|---|---|
| 5,989,428 A | * | 11/1999 | Goronszy | 210/605 |
| 6,036,862 A | | 3/2000 | Stover | |
| 7,329,352 B2 | * | 2/2008 | Tokutomi | 210/620 |
| 7,332,093 B2 | * | 2/2008 | Rosen et al. | 210/739 |

FOREIGN PATENT DOCUMENTS

| WO | WO99/24370 | 5/1999 |
|---|---|---|
| WO | WO01/02158 | 4/2001 |

OTHER PUBLICATIONS

Hansen, Joachim; "Fuzzy Controls for the Optimization of Nutrients Removal in Municipal Sewage Treatment Plants," No. XP-000803516, Korrespondenz Abwasser 1998(45) Nr. 12, pp. 2259-2268.

* cited by examiner

*Primary Examiner*—Chester T Barry
(74) *Attorney, Agent, or Firm*—Coats & Bennett, P.L.L.C.

(57) ABSTRACT

A method of treating wastewater wherein the biomass associated with the wastewater is subjected to simultaneous nitrification and denitrification in a single reactor. The method entails directing a wastewater influent stream into the reactor and measuring the concentration of $N-NH_4$ in the influent wastewater stream at a point upstream from the reactor. Air is supplied to the reactor for aerating the biomass in the reactor. The method includes controlling the quantity of air introduced into the reactor based in part at least on the measured concentration of $N-NH_4$.

30 Claims, 5 Drawing Sheets

REGULATING AIR VELOCITY CONTINUOUSLY INJECTED INTO BIOLOGICAL WATER TREATMENT REACTOR

This application is a U.S. National Stage application of PCT Application No. PCT/FR2005/001320, with an international filing date of May 27, 2005. Applicant claims priority based on French application serial no. 04 05970 filed Jun. 2, 2004.

This invention relates to water treatment. More precisely, the invention relates to treatments of urban or industrial effluents by a method for elimination of nitrogenous and carbonaceous pollution due to a biomass in a free or fixed culture on a solid material.

A conventional technique for depollution of water uses a biological reactor such as a biofilter or an activated sludge.

According to this technique, the reactor is aerated for the treatment of pollution. Prior art is usually based on two distinct treatment phases, one nitrification (N) requiring oxygen, and the other denitrification (DN) requiring the absence of oxygen. These two process phases may be done either in a single reactor with aeration and then non-aeration periods (sequenced aeration), or in a reactor with two specific compartments (one continuously aerated and the other never aerated).

The invention consists of performing these two opposite reactions (Nitrification/Denitrification) simultaneously in the same reactor without any specific compartmentalisation dedicated to one or the other of the reactions and with permanent aeration. However, the level of this aeration must be correctly controlled because the higher the amount of excess oxygen available in the reactor, the more denitrification is inhibited and vice versa.

Thus, the global efficiency of the depollution method depends directly on the aeration adjustment.

In methods according to prior art, given parameters are usually measured in the reactor or at the output from the reactor, so that the aeration of the biomass can be adjusted. Their purpose is to determine the state of the system at a given instant. A gas flow control is calculated and then applied when this state has been determined. It is usually a measurement of ammonium, nitrates, the oxidation-reduction potential or dissolved oxygen. Other parameters that can be called "composites" are also used. They are linear combinations of measured variables.

Thus, in the framework of the control over the method for the treatment of urban residual water, the polluting content indicator (mass of N—NH4 in kilograms per cubic meter of aerated reactor and per day) has already been validated as data useful for control.

The patent application published under number WO 01/02306 A1 defines an estimator of this polluting content starting from conductivity and turbidity measurements.

However, it is an estimate rather than a direct measurement. This type of tool cannot be used for a regulation that requires a high degree of precision.

One of the justifications for using such estimators is based on the purchase and maintenance cost of specific analysers. Therefore, it can be understood that this low cost is accompanied by very limited performances.

At the present time, the state of the art makes a distinction between different types of regulation strategies.

According to one of these regulation strategies, the usage efficiency of distributed oxygen by the biomass "Ct" is calculated to regulate the gas flow. This is described in the patent published under number FR 2 764 817.

This technique requires the use of a reference Ct that itself depends on the pollution to be treated. However, the difficulty lies in the fact that the polluting content varies in time and therefore this reference Ct needs to be changed regularly so that it is always consistent, which excludes application in the case of strongly variable effluents.

Other techniques use linear combinations of input variables to the system (ammonium, nitrates, etc.) to calculate the air flow control to be applied, as described particularly in the international patent application published under number WO 93/07089.

However, these techniques are based on empirical or semi-empirical models. The control functions used are based essentially on data derived from experience with prior operations. If the model is no longer adapted due to a change in the biomass or filter performances, aeration will no longer be optimal.

Prior art also proposed control systems using a so-called "Feedback/Feedforward" regulation loop.

According to one approach to these systems, some authors propose strategies to control the dissolved oxygen concentration in the biological reactor by the use of a measurement of ammonium at the input.

According to another approach, the concept of the ammonium content to be treated is used to predict the necessary change to the dissolved oxygen set value. This invention does not use the dissolved oxygen measurement that represents the available oxygen only, and not the oxygen necessary to the biomass.

According to other techniques, regulation of the aerated volume is based on compartmentalization of the reactor (and not on regulation of a gas flow or velocity). However, the fundamentally discrete nature (discontinuous variation of the aerated volume) of this type of strategy is the reason why authors always backup their system with a dissolved oxygen regulation.

In any case, most publications are based on results derived from simulations (Activated Sludge Model) or batch tests with synthetic water.

In practice, very few experiments have been carried out at pilot scale or on site. Furthermore, the experiments carried out are almost exclusively for activated sludge biological reactors.

In particular, the purpose of the invention is to overcome the disadvantages and/or inadequacies of prior art.

More precisely, the purpose of the invention is to propose a method of treating water using a biological reactor that is not compartmentalised, integrating a biomass aerated by continuous air injection in which the air injection control is optimised compared with techniques according to prior art.

In this context, the purpose of the invention is to simultaneously perform nitrification and denitrification and carbon abatement steps in the same chamber and at the same time.

Another purpose of the invention is to provide such a method that is efficient under all circumstances, including when there are large variations with time in the polluting content of water to be treated.

Another purpose of the invention is to provide such a method for adjusting the injected air control as a function of biomass performances.

Another purpose of the invention is to provide such a method to envisage relatively fast return on investment and operating savings. In this sense, the purpose of the invention is to propose such a method for avoiding extra operating costs caused by daily peaks of polluting contents.

Another purpose of the invention is to provide such a method for controlling injected air without it being necessary to make measurements of dissolved oxygen.

Yet another purpose of the invention is to provide such a method that is easy to implement.

These objectives, and others that will become clearer later, are achieved with the invention for which the purpose is a water treatment method including nitrification and denitrification processes occurring within the same chamber of a biological reactor in order to abate the nitrogenous pollution called the input content contained in said water, said reactor integrating a biomass aerated by injection of oxygenated gas, said method including at least one step for regulation of the velocity of said injected gas, characterised in that said gas injection is continuous and in that said nitrification and denitrification processes are essentially simultaneous, said method including a continuous measurement of said input content of N—NH$_4$ (CV$_{EDD}$) contained in said water, said input content being measured and weighted by an offset in time to deduce a control for velocity of said gas to be injected as a function of time.

Note that continuous injection of oxygenated gas refers to a permanent although variable injection.

Note that the input content CV$_{EDD}$ can be expressed as follows:

$$CV_{EDD} = \frac{Q \times C_{NH4} \times 24}{1000 \times 1000 \times V_{aerated}}$$

where:

Q is the supply flow (expressed here in liters per hour), C$_{NH4}$ is the measured input ammonium concentration (in mg N—NH4 per liter) and V$_{aerated}$ is the volume of the aerated reactor (in m$^3$).

In the case in which there are several identical reactors in parallel, the aerated volume is equal to the product of the number of aerated reactors in operation (nf) and the unit surface area (S$_u$) and the unit height (hmat) of each reactor, namely V$_{aerated}$=nf×S$_u$×h$_{mat}$ and S=nf×S$_u$ (total surface area of the aerated reactor).

Thus, the method according to the invention is based on a direct measurement of the content as an input parameter to a mathematical model for prediction of air needs (or more generally oxygen needs).

In this way, as will become clearer in the following, a water treatment method is obtained that gives more efficient and more precise control than methods according to prior art. This control enables continuous gas injection but variable in time corresponding to the needs of the biomass and enabling nitrification and denitrification simultaneously.

This offset in time (that can be variable) by which the measurement of the input content is weighted can take account particularly of the offset related to the transit time from the measurement point to the degradation location.

This offset related to transit corresponds substantially to the offset between the real time at which water enters the reactor and the time at which ammonium starts to be degraded.

This offset is also a means of taking account also takes account of the passage time in the reactor or the average residence time.

As will become clearer in the following, one particularly interesting result of such a method is that it can limit over- or under-aeration during daily peaks of the polluting content that introduce extra operating costs.

Also this invention enables a fast return on investment (in between 1 and 2 years) due to large performance savings.

Moreover, the method according to the invention may be applied to biofilters and to most water treatment methods, particularly such as activated sludge including membrane bioreactors, methods with fixed cultures such as biofilters, fluidised beds, methods with mixed cultures.

According to one preferred solution, said regulation step(s) is (are) based on the following air velocity control law as a function of time:

$$V_{air}(t) = \alpha(H(t) * CV_{EDD}(t) - CV_{setvalue}) + \beta,$$

in which CV$_{setvalue}$ is an output content set value and H(t) is the inverse Laplace transform of a phase delay function H(S).

Note that the "*" symbol indicates a convolution product.

Thus, the air injection control can be permanently corrected as a function of variations in the input content in the continuously made measurement, so that a high treatment efficiency can be achieved on different effluents, and particularly on effluents with large variations of the content in time.

The reasoning used to set up such a trend control law is described in detail below.

The purpose of the control law is to relate the N—NH4 input content (in kg of N—NH4/m$^3$ of aerated reactor/D) entering the biological reactor to the air flow and then to the air velocity, the N—NH4 input content being the content actually applied to the reactor, in other words the content evaluated from the mix of settled water and recirculated water.

This variable is used to simultaneously take account of flow and concentration variations.

It is also a design parameter for industrial sites.

It is observed that the eliminated real content is constant for a given air flow over a period of 24 hours. This assumption is verified by the analysis of several tests with buffer water at constant airflow.

During experiments, the ammonium concentration and the supply flow are varied such that the applied content remains constant.

These experiments show that after the transient phase, the eliminated N—NH4 content returns to an equal level with the only invariable parameter being the airflow.

Figure 1:
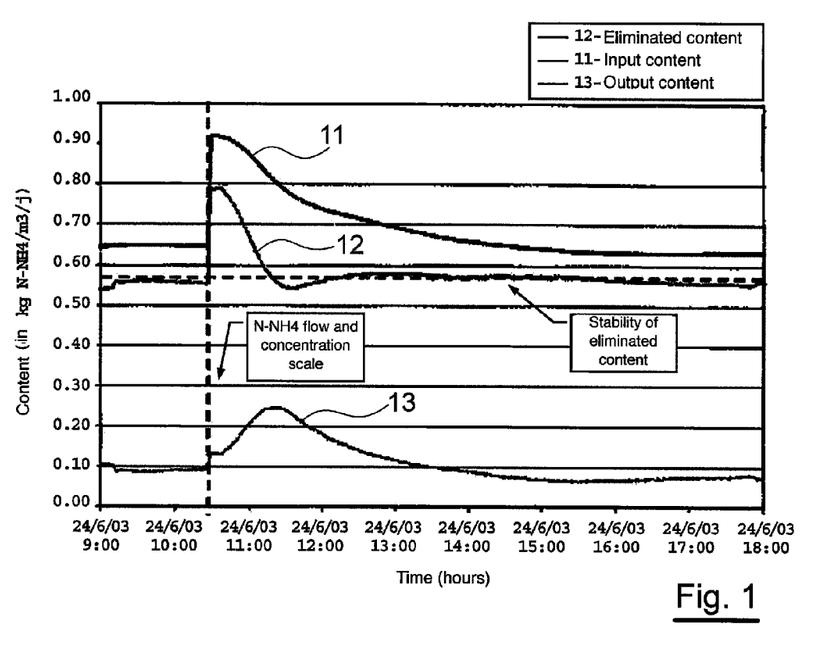
FIG. 1 is a graph showing variations in concentration of ammonium at constant content, in buffered water.

This is clearly shown in the diagram in FIG. 1 that demonstrates variation with time of:

the input content 11;
the eliminated content 12;
the output content 13.

Therefore a linear relation between the eliminated content (C$_{Ve}$) in N—NH4 and the air velocity under steady state conditions was produced:

$$V_{air}(t) = \alpha * CV_e(t) + \beta$$

where $$V_{air} = \frac{Q_{air}}{nfxS_u}$$

However, the relation obtained still does not take account of transient phenomena.

Therefore, one of the special features of the invention is how transient phenomena are taken into account to obtain parameters in the above relation.

To relate the eliminated content to the air velocity, the transit time in the reactor or the average residence time Tg (average transit time of a fluid particle in a reactor considered) has to be taken into account. In practice, the parameter Tg is obtained by studying the cross-correlation coefficient relating the diluted decanted water concentration (decanted water+ recirculated water) to the method output measurement.

According to the previous observations, the content eliminated for a fixed airflow is constant, and if the supply flow is fixed, the effective result is a constant N—NH4 abatement (difference between Input/Output concentrations).

Thus, the output ammonium concentration is then expressed as a function of the diluted input concentration:

$$[NH4],(t)=[NH4]_e(t-Tg)-Cst$$

where Cst is a constant that will for example be defined by the measurement.

Furthermore, the cross-correlation coefficient is a maximum for the step n corresponding to the time offset Tg=nTe (where Te is the sampling period).

By extension, the eliminated content is calculated by taking the difference between the input content and the output content to which a delay equal to Tg is applied. The air velocity at time t can then be expressed as a function of the eliminated content calculated at the same time (see FIG. 2, curve (F(t)).

Nevertheless, this method does not take account of the real time at which the diluted decanted water penetrates into the reactor and at which ammonium starts to be degraded, this offset being related to the transit from the measurement point to the degradation location.

Similarly, it does not take account of the variation in aeration that probably has no immediate effect on the hydraulics of the system.

Figure 2:
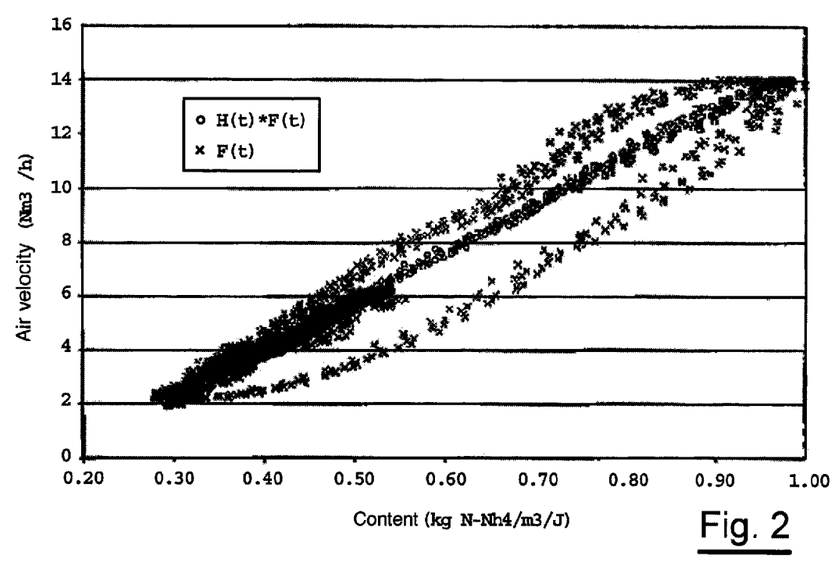
FIG. 2 shows two records of air velocity as a function of the calculated eliminated content for a biofilter.

All these phenomena induce a dispersion of values (as shown in FIG. 2 in the case of a biofilter) and therefore an uncertainty on the air velocity to be applied up to ±15% around 7 Nm/h. Therefore another special feature of the invention is related to the application of a phase delay function H(s) that corrects these omissions and obtains the expected linearity (as shown on curve H(t)*F(t) in FIG. 2).

Thus, the content eliminated with time ($Cv_e$) is equal to the difference in content between the entry ($CV_{EDD}$) convoluted by H(t) (inverse Laplace transform of a phase delay function H(s)) and the output ($Cv_e$).

This methodology can be used to obtain the linear relation between the air velocity and the previously calculated eliminated content. Therefore, the control law is obtained as follows:

$$Vair(t)=\alpha(H(t)*Cv_{EDD}(t)-Cv_{SETVALUE})+\beta$$

Furthermore, it is known that the use of models with empirical parameters introduces disadvantages in terms of deployment on sites.

Obtaining values necessary for the settings is not always compatible with operating priorities in a treatment plant.

Therefore, this invention provides a theoretical way of obtaining preliminary settings.

This was demonstrated by a verification of the model, consisting of comparing the observed empirical law with a theoretical law in order to overcome sizing and scale transfer problems.

The empirical law obtained depends on calculation of the theoretical oxygen needs corresponding to nitrification and elimination of carbon. O2 needs are determined using the following known relations:

Nitrification: B.02NH4=4.57×Eliminated mass of N—NH4

Denitrification: B.02N03=−2.86×(Eliminated mass of N—NH4−Mass of NO3 produced)

Carbon: B.02CODs=0.90×Eliminated mass of CODs.

Therefore the oxygen need for the biological reactor is expressed as the sum of the previous needs. Air needs are derived from these oxygen needs. There is a relation between them and the transfer efficiency, the value of which reduces with the air velocity.

Figure 3:
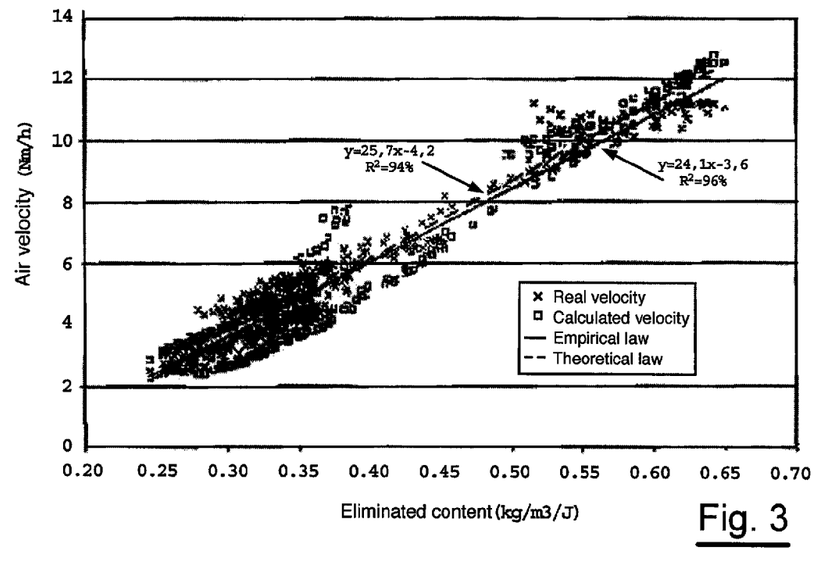
FIG. 3 is a graph showing a comparison of empirical and theoretical air demands for a biofilter.

FIG. 3 is a graph used to compare the empirical air demand 32 and the theoretical air demand 31 for a biofilter. This graph shows that theoretical air needs thus calculated agree well with the empirical law. Therefore there is a theoretical basis for obtaining the required parameters on site.

Note that the coefficients for the two linear regressions correspond to the values of $\alpha$ and $\beta$ ($\alpha$ is equal to 25.7 by theory and 24.1 by measurement, $\beta$ is equal to −4.2 by theory and −3.6 by measurement), $R^2$ representing the confidence coefficient on 100% associated with each linear regression (the coefficients obtained firstly by measurement and secondly by theory are practically identical).

Preferably, the control law is expressed in open loop as follows:

$$Vair(t)=\alpha(H(t)*CV_{EDD}(t)-CV_{SETVALUE}(t+\Delta t))+\beta$$

In this way, the term $CV_{SETVALUE}$ ($t+\Delta t$) anticipates a future variation of the output content set value. This solution can offer non-negligible additional flexibility to optimise the use of a plant.

According to one preferred embodiment, said delay function is of the following type:

$$H(S)=\left(\frac{1}{1+\frac{V}{nQ}s}\right)^n$$

n is a distribution adjustment parameter in said reactor(s);

V is the apparent volume of said biological reactor(s);

Q is the supply flow of said water to be treated;

s is the Laplace transform of the variable t.

This function corresponds to the transfer function of a series of n perfectly stirred reactors (RPA) in the Laplace space, where n is a positive integer.

This phase delay function described herein is in the mathematical form of a series of perfectly stirred reactors (RPA), the parameters of which are the flow and volume. The flow is slaved to the column filtration flow because only the apparent volume V is used to adjust the function.

More generally, any mathematical expressions using combinations of ideal reactor transfer function can be used.

Therefore, the phase delay function may be of different types, in other possible embodiments.

For example, this function may be expressed in the form of a transfer function representing a series of four RPAs where n=4.

According to one advantageous solution, the method includes at least one step to measure an output content ($Cv_s$) and/or a dissolved ammonium concentration contained in said treated water.

In this case, said measurement of said output content ($Cv_s$) is preferably used to adjust said set value by application of the following equation:

$$Cv_{SETVALUE}(t) - Cv_s = \text{error}(t)$$

$$\text{where error}(t) = \frac{24 x Qxe(t)}{(1000 x 1000 x h_{mat} xS)}$$

the signal e(t) being defined by:

$$e(t) = [NH_4]_{SETVALUE}(t) - [NH_4]_s(t)$$

where $h_{mat}$ at is the height of said biomass in said reactor and S is the surface area of said reactor(s), the resulting volume of the product of $h_{mat}$ and S representing the aerated volume of said biological reactor.

This formula is derived from the content calculation, e(t) in this formula representing the difference in concentration between the set value $[NH4]_{setvalue}(t)$ and the output measurement $[NH4]_s(t)$.

This invention provides a continuous correction to the prediction model using this type of retroaction system, so that it is always in agreement with the reality.

Thus, errors in the trend curve model or non-measurable disturbances can be compensated, by adding a retroaction term. A closed loop with a trend curve can be used to obtain better results than a "FeedForward" or "Feedback" regulator alone.

Therefore, one of the specific features of the retroaction lies in evaluation of the error.

It is not solely a difference between the measurement of dissolved ammonium at the output and the set value (denoted e(t)), but a difference between an output content and a set content (denoted error(t)).

Although there is a relation between e(t) and error(t), the difference between these two parameters is fundamental.

According to a first embodiment, said measurement of an output content ($Cv_s$) and/or a concentration of dissolved ammonium contained in said treated water, is made continuously.

The regulator implicitly takes account of variations of the supply flow in calculating the action to be applied.

According to one preferred embodiment, the method comprises a transformation step of said signal e(t) made such that:

if $e > 0, f(e) = e$ if $e \leq 0, f(e) = 1 - \exp(-k, e)$, where $k > 0$.

Note that k provides a means of graduating the intensity of the signal transformation.

Thus, an improvement is made using a transform of the signal e(t). The output concentration of ammonium is not strictly a gas flow linear function because it is limited by zero. For example, when the set value is 2 mg N—NH4/L, the error between the measurement and the set value can only take account of values within the interval $[-2, +\infty[$, and in this case there is an unwanted asymmetry of the regulation interval.

Therefore, such a transform can take account of this asymmetry.

This transformation provides a means of amplifying the reaction of the regulator when it approaches the lower limit.

In the case of a set value equal to 2 mg N—NH4/L, the error will then be equal to values within the interval $[-6.4, +\infty[$ if k=1.

Thus, the saturation effect is limited at the price of a weak destabilisation of the system due to an increase in the gain of this operating condition.

Other transformations such as $f(x) = x^2$ could be imagined, which could give a small control variation when close to the set value, and a larger variation as the error from the set value increases.

Finally, the use of a Feedback or Feedforward regulation loop offers increased security because the control is a composition of several signals. When some information is missing, other information can still provide a regulation even if its performance is lower.

The invention also relates to a device for use of the water treatment method including nitrification and denitrification phases in the same chamber of a biological reactor as described above, said reactor including a biomass aerated by air injection and means of regulating the velocity of said injected air, characterised in that it comprises:
means of continuously measuring said incoming content;
means of configuring a set value for an output content and/or and an output concentration ($Cv_{setvalue}$);
calculation means designed to act on said regulation means based on a control law in which said measured input content is weighted in particular by a time offset to deduce a control for the velocity of said air to be injected from it as a function of time, said air injection being continuous and said nitrification and denitrification processes essentially being simultaneous.

Such calculation means may include the use of software means.

It may also be noted that this invention does not use any dissolved oxygen measurements or set values to achieve these objectives.

According to one preferred embodiment, the device comprises a retroaction loop comprising means of measuring an output content ($Cv_s$) and/or a concentration of dissolved ammonium contained in said treated water, and means of comparing said output content with said output content set value.

In this case, said comparison means are preferably related to said calculation means in order to adjust said set value used in said control law.

Other special features and advantages of the invention will become clearer after reading the following description of a preferred embodiment of the invention given as an illustrative and non-limitative example, and the appended figures, wherein.

Figure 4:
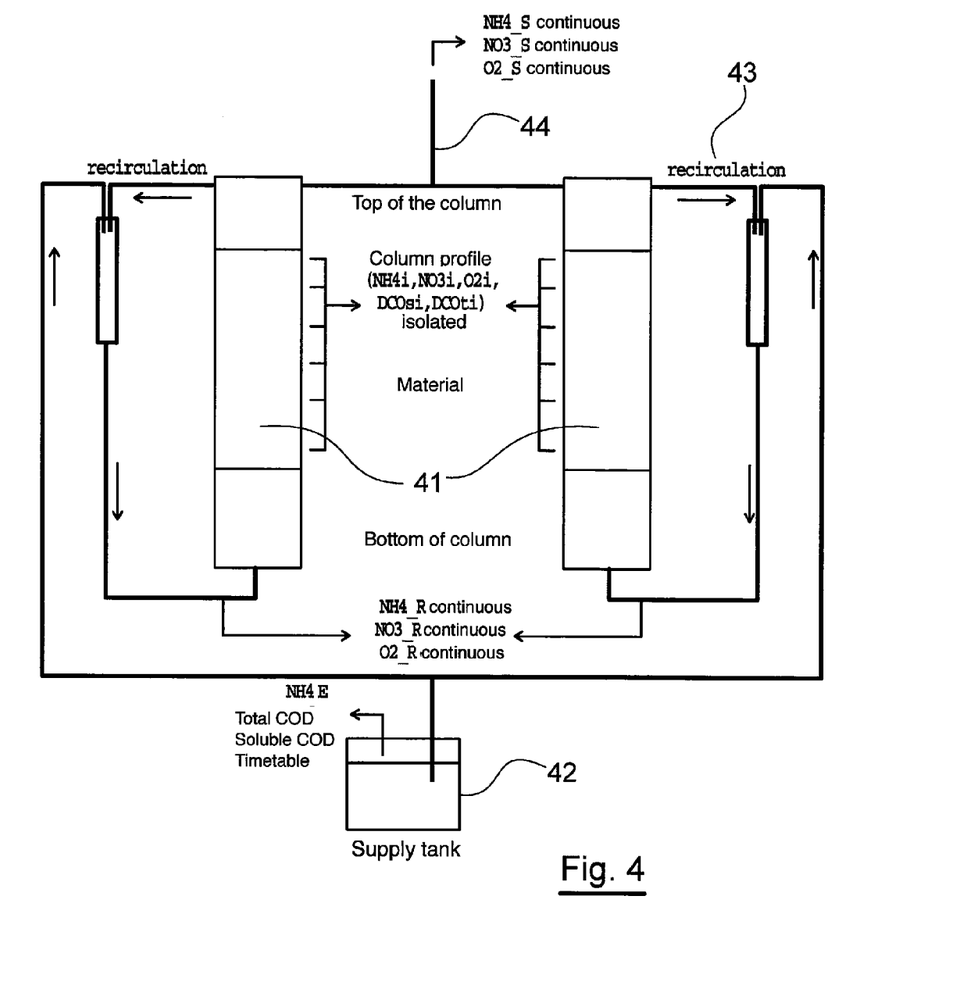
FIG. 4 is a diagrammatic view of a pilot unit according to the invention.

The efficiency of the method according to the invention is demonstrated in the following through tests carried out using a pilot unit like that shown in FIG. 4.

As can be seen, this unit is composed of two 5 m high Plexiglas columns with an inside diameter of 29 cm. The material height (h mat) used for the simultaneous Nitrification/Denitrification (NDN) tests is 2.75 m and the average diameter of the balls used in it is 3.34 mm±0.19 mm.

The treated effluent is derived from an urban water network; it is firstly settled (lamellar settlement tank) before being routed by gravity into a permanently stirred 30-liter buffer tank 42. The influent is then lifted by two SEEPEX pumps so as to fill the two pressurising columns. These give a maximum available pressure loss of 2.40 mCe.

A fraction 43 of the treated water is reused in the framework of nitrification/denitrification to supply the pilot unit. This water is mixed with supply water in pressurising columns. Once again, two Seepex pumps are used to recirculate required flows.

Non recirculated treated water 44 output from the two columns mixes in a common 10-liter tank from which samples to be analysed are taken. In this configuration, the pilot unit operates like a site comprising two filtration cells. The treatment is thus homogenised and in-line measurements are redundant.

Two air manifolds (not shown) located 20 cm from the bottom of each column are used to continuously but variably inject processed air throughout the reactor, and two other orifices at the bottom of each are used for injection of washing air. In both cases, air production is assured by a compressed air network.

The content applied during the tests calculated on the entire material is between 0.3 and 0.6 kg N—NH4/m3/D for an average of 0.45 kg N—NH4/m3/D. The corresponding average water supply flow velocity $V_{water}$ is 1.2 m/h for an average recirculation rate of 125%. This rate is different from conventional NDN (in other words with a reactor with an aerated zone and a non-aerated zone) since the efficiencies involved are different.

Three study cases illustrate the performances of the invention; the first (FIG. 6) demonstrates the efficiency of regulation with fixed flow and a fixed recirculation rate. The second (FIG. 7) illustrates performances of regulation with variable flow and a fixed recirculation rate. And the third (FIG. 8) shows the results obtained with variable flow and a variable recirculation rate.

Figure 6:
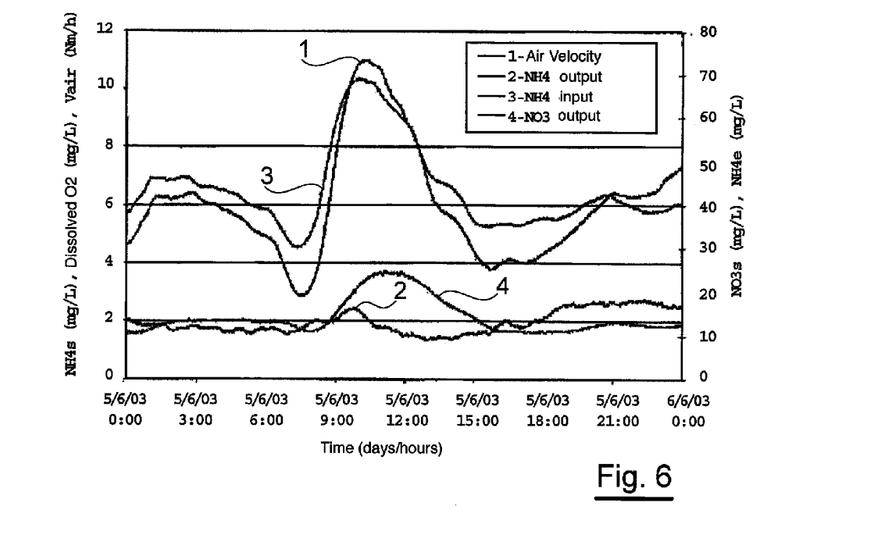
FIG. 6 shows curves of records obtained with the method according to the invention, with fixed supply flow and recirculation rate.

Therefore FIG. 6 shows that it is possible to eliminate the daily peak content by anticipating air needs. There is no under or over-aeration zone before or after the peak content, unlike what happens in prior art. Therefore, denitrification is not penalised to achieve the nitrification objective because the aeration control provides a means of maintaining exactly the same ammonium concentration throughout the day.

Figure 7:
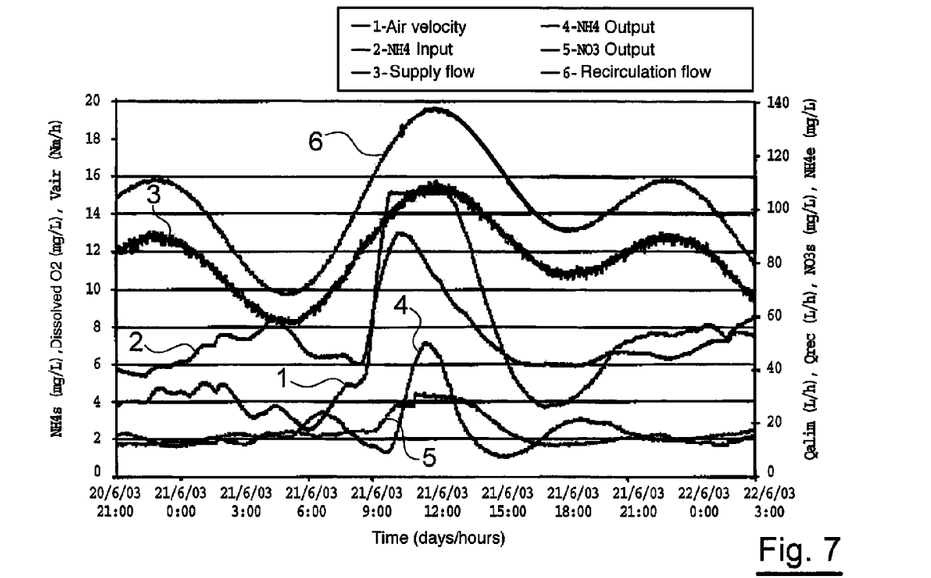
FIG. 7 shows curves of records obtained with the method according to the invention, with a variable supply flow and a fixed recirculation rate.
Figure 8:
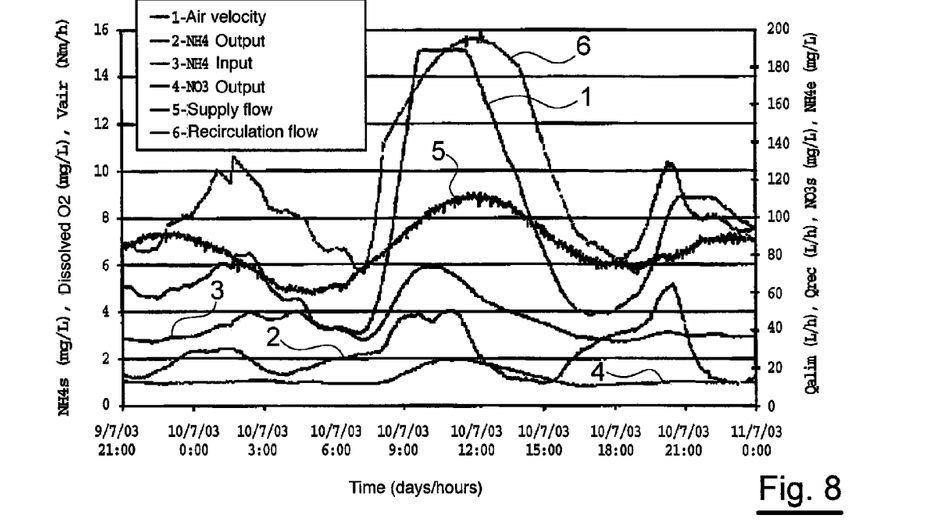
FIG. 8 shows curves of records obtained with the method according to the invention, with variable supply flow and recirculation rate.

It is seen that the regulation according to the invention operates correctly and anticipates the peak content under variable supply flow conditions (FIG. 7). Except for a short period during which the content is such that the saturation in air velocity has been reached. Aeration was reduced so that it does not exceed 15 Nm/h so as to be representative of the major part of the installations.

Finally, when used with variable supply flows and variable recirculation rates (FIG. 8), which is not typical of industrial installations, the results are degraded but remain better than in prior art.

Figure 5:
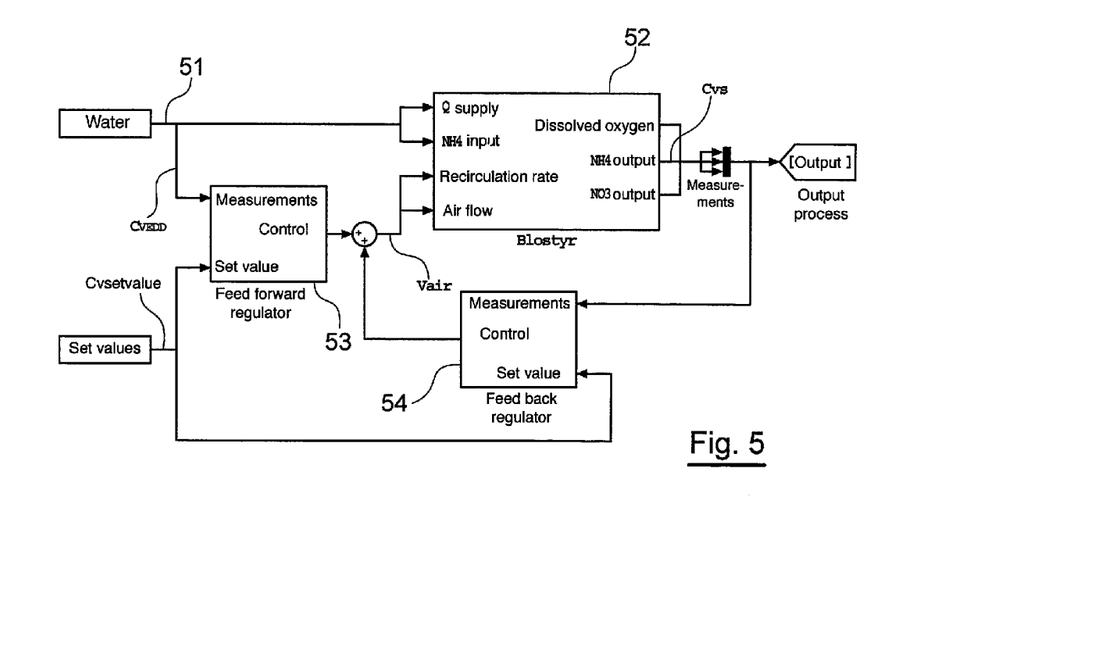
FIG. 5 is a diagrammatic view of a "Feedback/Feedforward" regulation block according to the invention.

These results are obtained using a regulation block like that illustrated in FIG. 5 that corresponds to a preferred embodiment of the method according to the invention.

As shown, water to be treated 51 is directed to a biological reactor 52, the supply flow Q and input content data being associated with this water to be treated. Remember that according to the principle of the invention, the nitrification and denitrification processes take place within the same chamber in the reactor (the reactor actually having only one compartment) and these nitrification and denitrification processes are essentially simultaneous.

Measurements are made on this water to be treated using a first regulator 53 called the "Feedforward" regulator that in particular makes a continuous measurement of the content between $Cv_{EDD}$.

The regulator also receives information about the output content set value $Cv_{setvalue}$.

Another regulator 54 called the "Feedback" regulator collects information and particularly the continuously measured output content $C_{VS}$.

The regulator 54 also receives information about the output content set value $Cv_{SETVALUE}$.

The regulator used for the retroaction loop may be of the PID (proportional integral derivative regulator) type or PFC (Predictive Functional Control) type.

These regulators are configured so that each outputs a command. The corresponding commands are processed so as to act on the air velocity $V_{air}$, by applying the air velocity control law as a function of time:

$$Vair(t)=\alpha \times (H(t) * Cv_{EDD}(t) - Cv_{SETVALUE}(t)) + \beta + Vair_{Retroaction}$$

The coefficients $\alpha$ and $\beta$ may be obtained by measurements or by calculation, as described above.

Vair retroaction corresponds to the variation of the airflow necessary calculated by the regulator in the retroaction loop.

Furthermore, in the case of the previously described pilot unit, the phase delay function H(s) is expressed as follows:

$$H(s) = \left( \frac{1}{1 + \frac{V}{4Q}s} \right)^4$$

Furthermore, the command output from the regulator 54 is obtained by the calculation corresponding to the following instructions:

$$Cv_{SETVALUE}(t) - Cv_s = \text{error}(t)$$

$$\text{where error}(t) = \frac{24 \times Q \times e(t)}{(1000 \times 1000 \times h_{mat} \times S)}$$

the signal e(t) being defined by:

$$e(t) = [NH_4]_{SETVALUE}(t) - [NH_4]_s(t)$$

With the parameters mentioned above (Vwater=1.2 m/h and hmat=2.75 m) the error(t) is defined as follows:

$$\text{error}(t) = 1.05 \times 10^{-2} e(t)$$

The invention claimed is:

1. Water treatment method, using a biological reactor in order to abate the nitrogenous pollution called the input content contained in said water, said reactor integrating a biomass aerated by injection of air, said method including at least one step for regulation of the velocity of said injected air, characterized in that it includes a continuous measurement of said input content of N—NH$_4$ ($CV_{EDD}$) contained in said water, said input content being measured and weighted by an offset in time to deduce a control for velocity Vair of said air to be injected as a function of time.

2. Water treatment method set forth in claim 1, characterized in that said regulation step is based on the following air velocity control law as a function of time:

$$V\text{air}(t)=\alpha(H(t)*CV_{EDD}(t)-CV_{setvalue})+\beta$$

in which $CV_{setvalue}$ is an output set value and H(t) is the inverse Laplace transform of a phase delay function H(S).

3. Water treatment method set forth in claim 1, characterised in that said regulation step is based on a control law, as follows:

$$V\text{air}(t)=\alpha(H(t)*CV_{EDD}(t)-CV_{setvalue})+\beta.$$

4. Water treatment method set forth in claim 3, characterized in that said phase delay function is of the following type:

$$H(S) = \left(\frac{1}{1+\frac{V}{nQ}s}\right)^n$$

where
n is a distribution adjustment parameter in said reactor(s);
V is the apparent volume of said biological reactor(s);
Q is the supply flow of said water to be treated;
s is the Laplace transform of the variable t.

5. Water treatment method set forth in claim 1, characterized in that the method includes at least one step to measure an output content ($Cv_s$) and/or a dissolved ammonium concentration contained in said treated water.

6. Water treatment method set forth in claim 5, characterized in that said measurement of said output content ($Cv_s$) is used to adjust said set value by application of the following equation:

$$Cv_{SETVALUE}(t) - Cv_s = \text{error}(t)$$

$$\text{where error}(t) = \frac{24xQxe(t)}{1000x1000xh_{mat}xS}$$

the signal e(t) being defined by:

$$e(t)=[NH_4]_s(t)-[NH_4]_{SETVALUE}(t)$$

$h_{mat}$ being the height of said biomass in said reactor and S the surface area of said reactor(s), the resulting volume of the product of $h_{mat}$ and S representing the aerated volume of said biological reactor.

7. Water treatment method set forth in claim 5, characterised in that said measurement of an output content ($Cv_s$) and/or a concentration of dissolved ammonium contained in said treated water, is made continuously.

8. Water treatment method set forth in claim 6, characterized in that the method comprises a transformation step of said signal e(t) made such that:

if $e>0$, $f(e)=e$ if $e \leq 0$, $f(e)=1-\exp(-k,e)$, where $k>0$.

9. A method of controlling the aeration of biomass in a reactor that simultaneously performs nitrification and denitrification on wastewater in the reactor, comprising:
directing a wastewater influent stream into the reactor;
measuring the concentration of $N-NH_4$ in the influent wastewater stream at a point upstream from the reactor;
supplying air to the reactor for aerating the biomass in the reactor; and
controlling the quantity of air introduced into the reactor based in part at least on the measured concentration of $N-NH_4$ modified by a time difference factor.

10. The method of claim 9 including basing the time difference factor on a mathematical model.

11. The method of claim 9 wherein the time difference factor relates to a transient time from the point of measuring the $N-NH_4$ concentration to a location in the reactor.

12. The method of claim 9 including directing an effluent wastewater stream from the reactor; measuring the concentration of $N-NH_4$ in the effluent wastewater stream at a point downstream from the reactor; and controlling the quantity of air introduced into the reactor based in part on the measured concentration of $N-NH_4$ in the effluent wastewater stream.

13. The method of claim 12 including basing the time difference factor on a mathematical model.

14. The method of claim 9 including continuously measuring the $N-NH_4$ concentration in the wastewater influent stream and continuously controlling the quantity of air introduced into the reactor based on the measured concentration of $N-NH_4$ and the time difference factor.

15. The method of claim 9 wherein the time difference factor is a function in part at least of:

$$H(S) = \left(\frac{1}{1+\frac{V}{nQ}s}\right)^n$$

where
n is a distribution adjustment parameter in said reactor(s);
V is the apparent volume of said biological reactor(s);
Q is the supply flow of said water to be treated;
s is the Laplace transform of the variable t.

16. The method of claim 9 wherein controlling the quantity of air introduced into the reactor includes controlling the velocity of the air introduced into the reactor.

17. The method of claim 16 wherein the velocity of the air introduced into the reactor is a function, in part at least, of the measured concentration of $N-NH_4$ in the influent wastewater stream and $N-NH_4$ output set value.

18. A method of controlling the aeration of biomass in a reactor that simultaneously performs nitrification and denitrification on wastewater in the reactor, comprising:
directing a wastewater influent stream into the reactor;
measuring the concentration of $N-NH_4$ in the influent wastewater stream at a point upstream from the reactor;
supplying air to the reactor for aerating the biomass in the reactor; and
controlling the quantity of air introduced into the reactor based in part at least on the measured concentration of $N-NH_4$ and a mathematical model.

19. The method of claim 18 wherein the mathematical model includes a time difference factor.

20. The method of claim 18 including directing an effluent wastewater from the reactor, measuring the concentration of $N-NH_4$ in the effluent wastewater stream at a point downstream from the reactor; and controlling the quantity of air introduced into the reactor based in part at least on the measured concentration of $N-NH_4$ in the effluent wastewater stream.

21. The method of claim 18 including continuously measuring the N—NH$_4$ concentration in the wastewater influent stream, and continuously controlling the quantity of air introduced into the reactor based in part at least on the measured concentration of N—NH$_4$.

22. The method of claim 19 wherein the time difference factor is a function in part at least of:

$$H(S) = \left(\frac{1}{1 + \frac{V}{nQ}s}\right)^n$$

where n is a distribution adjustment parameter in said reactor(s);
V is the apparent volume of said biological reactor(s);
Q is the supply flow of said water to be treated;
s is the Laplace transform of the variable t.

23. A method of treating wastewater by simultaneously performing nitrification and denitrification in a single reactor, comprising:
  directing an influent wastewater stream into the reactor;
  directing air into the reactor and aerating biomass associated with the wastewater in the reactor and simultaneously nitrifying and denitrifying the biomass in the single reactor;
  measuring the concentration of nitrogenous pollutants in the wastewater stream upstream from the reactor; and
  effectuating simultaneous nitrification and denitrification by controlling the quantity of air introduced into the reactor based in part at least on the measured concentration of the nitrogenous pollutants.

24. The method of claim 23 wherein the nitrogenous pollutants include N—NH$_4$ and the method includes measuring the concentration of N—NH$_4$ in the wastewater stream upstream from the reactor.

25. The method of claim 23 including controlling the velocity of air introduced into the reactor based in part at least on the measured concentration of the nitrogenous pollutants.

26. The method of claim 23 including controlling the quantity of air introduced into the reactor based in part at least on the measured concentration of the nitrogenous pollutants modified by a time difference factor.

27. The method of claim 24 including directing an effluent wastewater stream from the reactor; measuring the concentration of the nitrogenous pollutants in the effluent wastewater stream at a point downstream from the reactor; and controlling the quantity of air introduced into the reactor based in part at least on the measured concentration of the nitrogenous pollutants in the effluent wastewater stream.

28. The method of claim 23 further including controlling the quantity of air introduced into the reactor based in part at least on a time difference factor.

29. The method of claim 26 wherein the time difference factor is a function in part at least of:

$$H(S) = \left(\frac{1}{1 + \frac{V}{nQ}s}\right)^n$$

where n is a distribution adjustment parameter in said reactor(s);
V is the apparent volume of said biological reactor(s);
Q is the supply flow of said water to be treated;
s is the Laplace transform of the variable t.

30. The method of claim 23 including controlling the quantity of air introduced into the reactor based in part on a mathematical model.

* * * * *